(12) United States Patent
Johansson et al.

(10) Patent No.: US 7,258,195 B2
(45) Date of Patent: Aug. 21, 2007

(54) ELECTROMAGNETIC HOLDING BRAKE

(75) Inventors: Conny Johansson, Hässelby (SE); Bruno Slettenmark, Järfälla (SE)

(73) Assignee: Siemens Aktiengesellschaft, Munich (DE)

( * ) Notice: Subject to any disclaimer, the term of this patent is extended or adjusted under 35 U.S.C. 154(b) by 298 days.

(21) Appl. No.: 10/948,451

(22) Filed: Sep. 23, 2004

(65) Prior Publication Data
US 2005/0068137 A1 Mar. 31, 2005

(30) Foreign Application Priority Data
Sep. 25, 2003 (EP) .................................. 03021736

(51) Int. Cl.
*B60L 7/00* (2006.01)
(52) U.S. Cl. ........................ 181/161; 335/285; 335/289
(58) Field of Classification Search ........ 181/161–165; 335/285, 289
See application file for complete search history.

(56) References Cited

U.S. PATENT DOCUMENTS

| 3,463,921 A | | 8/1969 | Warden |
| 4,022,301 A | * | 5/1977 | Hansen ...................... 188/72.1 |
| 4,777,768 A | | 10/1988 | Audi et al. |
| 7,007,779 B2 | * | 3/2006 | Johansson et al. .......... 188/161 |

FOREIGN PATENT DOCUMENTS

| AT | 84959 | 10/1920 |
| GB | 2 002 072 A | 2/1979 |

* cited by examiner

*Primary Examiner*—Ramon M. Barrera

(57) ABSTRACT

An electromagnetic holding brake comprising a switchable electromagnet (4) for holding a movable sheet (6) in a predetermined position, wherein said brake further comprises a second fixated sheet (5) which is arranged substantially parallel to the movable sheet (6), such that said movable sheet (6) is clamped between the electromagnet (4) and the second sheet (5) when the current is switched on.

7 Claims, 2 Drawing Sheets

ELECTROMAGNETIC HOLDING BRAKE

CROSS REFERENCE TO RELATED APPLICATIONS

This application claims priority to the European application No. 03021736.8, filed Sep. 25, 2003 and which is incorporated by reference herein in its entirety.

FIELD OF INVENTION

The present invention relates to an electromagnetic holding brake comprising a switchable electromagnet for holding a movable sheet in a predetermined position.

BACKGROUND OF INVENTION

Electromagnetic holding brakes of this kind are used in medical devices in order to clamp and hold a movable sheet. The movable sheet is connected with a certain part of the medical device, the position of which can be changed. The braking force or holding force can be defined as the force the sheet can be pulled with, without any movements occurring between the electromagnet and the sheet. The braking force depends on the thickness of the sheet, the magnetic properties of the sheet, the power of the electromagnet and the surface friction between the electromagnet and the sheet.

SUMMARY OF INVENTION

Ordinary sheets of steel show the phenomenon "residual magnetism". When the current is turned off in the electromagnet the residual magnetism remains in the sheet and then it is very difficult to loosen the electromagnet from the sheet. This problem gets severe with more powerful magnets and thicker sheets. An electromagnet requires a specific minimum sheet thickness to make sure that the necessary holding force is gene rated. Thus it is not possible to decrease the thickness of the sheet beyond a certain limit. However, the residual magnetism increases with more powerful electromagnets and thicker sheets.

It is therefore an object of the present invention to provide an electromagnetic holding brake which shows less residual magnetism, and besides, can generate the necessary braking force.

According to the present invention, this object is achieved by the claims.

The electromagnetic holding brake according to the present invention is a system of one electromagnet and two sheets. In addition to the previously used movable sheet it comprises a second fixated sheet so that the movable sheet can be clamped between the electromagnet and the fixated sheet. In this way the friction surfaces are considerably enlarged which leads to higher braking forces compared to a conventional electromagnetic holding brake. Further the residual magnetic force is reduced to a very low level in the electromagnetic holding brake of the present invention.

According to one aspect of the present invention the thickness of the second fixated sheet is larger than the thickness of the first movable sheet. In this way the braking force increases since the electromagnet is in direct contact only with the first movable sheet which is thinner than the second fixated sheet. The lower thickness of the first movable sheet also reduces the residual magnetic force to a very low level.

Further, it is advantageous that the electromagnet is fixated to a bearing and movable in a direction substantially normal to the plane of the first and second sheet and the movement of the electromagnet can easily be controlled through switching the current on and off. In the present invention it is preferred that the bearing is a plain bearing, in particular a spherical plain bearing. Such a bearing enables smooth operation of the electromagnetic holding brake of the present invention. It is preferred that the electromagnet is movable on a fixated axle. This axle is normal to the plane of the two sheets so that the electromagnet is moved perpendicular to the plane.

According to another aspect of the present invention the first and second sheets are made of steel or a material with magnetic properties. It is preferred to use steel sheets which are inexpensive.

According to an advantageous development of the present invention a spring can be arranged between the electromagnet and the movable sheet, such that said spring supports loosing of the electromagnet from the sheet when the current is switched off. Depending on the magnetic properties of the sheet material it may be useful to use this spring to make sure that the electromagnet easily looses from the sheet when the current is turned off.

The present invention further relates to a medical device. The medical device according to the present invention comprises an electromagnetic holding brake as described.

BRIEF DESCRIPTION OF THE DRAWINGS

The invention and its underlying principle will be better understood when consideration is given to the following detailed description of a preferred embodiment.

In the accompanying drawings:

FIG. 1 is a schematic representation of an electromagnetic holding brake according to the present invention in a first state when the current is switched on.

DETAILED DESCRIPTION OF INVENTION

Figure 1:
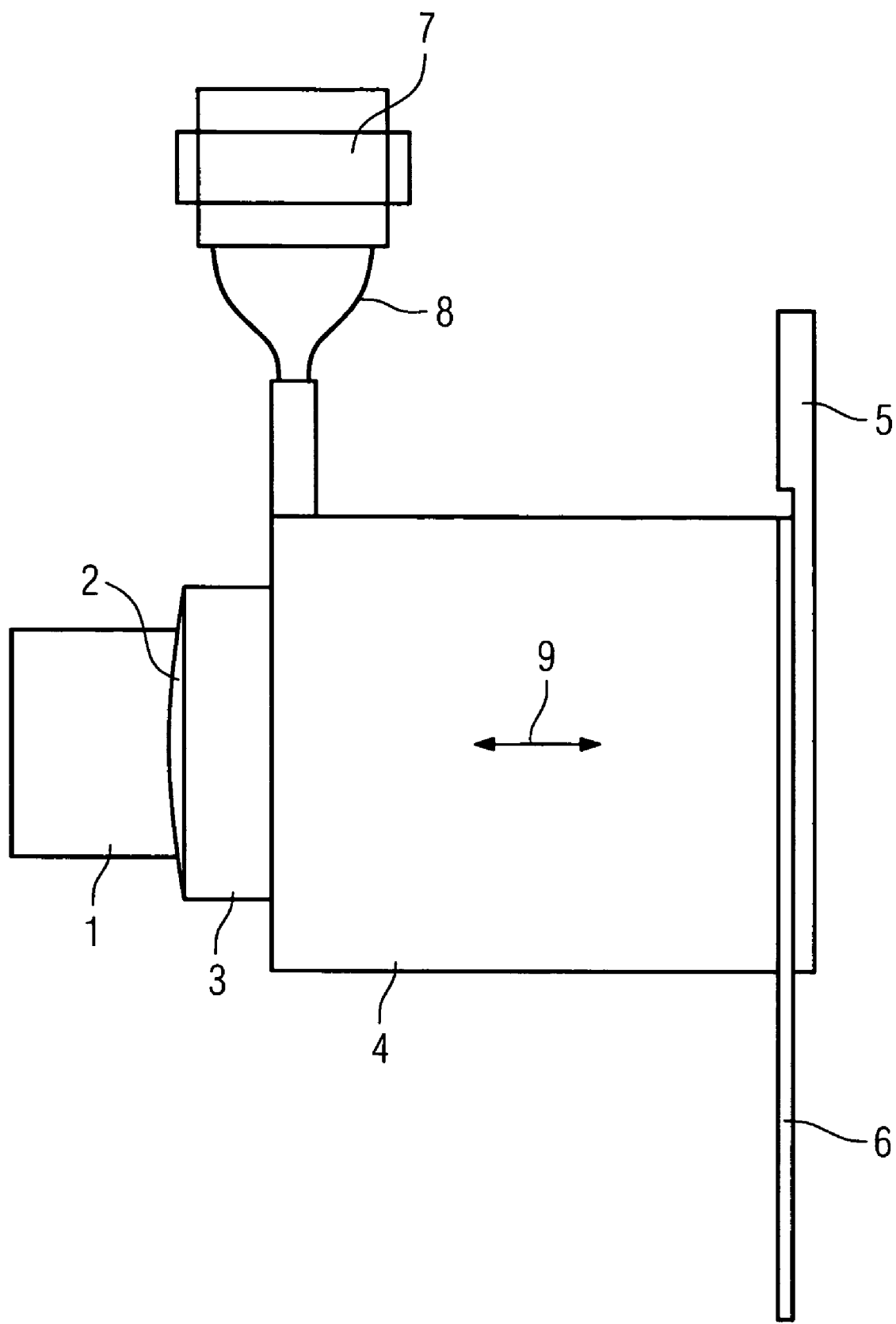

The electromagnetic holding brake of FIG. 1 comprises an electromagnet 4 with a connection sleeve 3, which is arranged between the electromagnet 4 and a spherical plain bearing 2. The electromagnet 4 is fixated to the bearing 2 and can only be moved in one direction on a fixated axle 1. The moving direction of the electromagnet 4 is indicated in FIG. 1 by arrow 9.

The electromagnet 4 is connected to a power source 7 through leads 8. FIG. 1 shows the electromagnetic holding brake when the current is switched on. In this state, when a current feeding the electromagnet is switched on, the electromagnetic braking force or holding force is generated and the electromagnet 4 clamps a movable sheet 6 such that the movable sheet 6 is clamped against both the electromagnet 4 and the fixated sheet 5.

The movable sheet 6 is part of a medical device and enables moving and positioning of certain parts of this device. As can be seen in FIG. 1 the movable sheet 6 is thinner than the fixated sheet 5. This leads to the effect that the residual magnetism is kept at a very low level compared to the generated holding force. This is also due to the fact that there exist two friction surfaces, one between the electromagnet 4 and the movable sheet 6 and one between the movable sheet 6 and the fixated sheet 5. In this embodiment the braking force is enlarged by approximately 50% due to the additional friction surface. Further, it is advantageous that the braking force increases with the thinner movable sheet 6.

Figure 2:
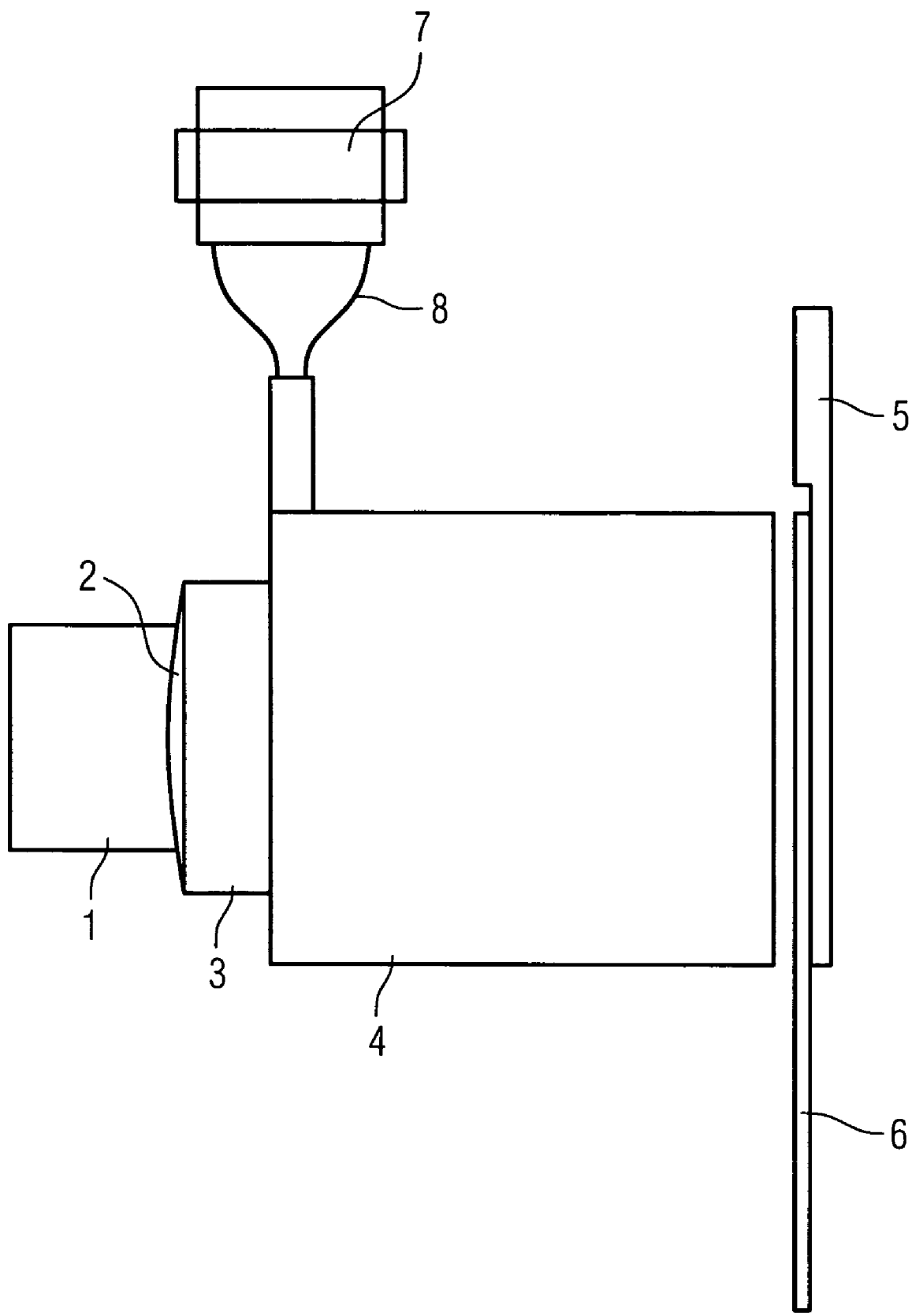
FIG. 2 shows the electromagnetic holding brake of FIG. 1 in a second state when the current is switched off.

FIG. 2 shows the electromagnetic holding brake of FIG. 1 in a second state when the current is switched off. When the current is switched off the electromagnet 4 moves on the fixated axle 1 to the left and remains in the second state as shown in FIG. 2. In this state the electromagnet is no longer in contact with the movable sheet 6 which enables moving of sheet 6. After switching off the current the movable sheet 6 does not adhere to the electromagnet 4 because the residual magnetism in the relatively thin sheet 6 is very low.

However, under certain circumstances it can be appropriate to arrange a spring between the electromagnet 5 and the movable sheet 6, so that the spring supports loosing of the electromagnet 4 from the sheet 6 when the current is switched off.

The invention claimed is:

1. An electromagnetic holding brake, comprising:
   a movable first plate;
   an electromagnet for holding the first plate in a predetermined position; and
   a fixed second plate arranged parallel to the movable first plate,
   wherein the first plate is clamped against both the electromagnet and the second plate when a current feeding the electromagnet is switched on; and wherein the first and second plates are made of steel.

2. The electromagnetic holding brake according to claim 1, wherein the electromagnet is switchable.

3. The electromagnetic holding brake according to claim 1, wherein the thickness of the second plate is greater than the thickness of the first plate.

4. The electromagnetic holding brake according to claim 1, wherein the electromagnet is fixated to a bearing, and movable in a direction normal to planes defined by the first and second plates.

5. The electromagnetic holding brake according to claim 1, wherein the electromagnet is movable along a fixed axis.

6. The electromagnetic holding brake according to claim 1, wherein the first and second plates include a magnetizable element.

7. A medical device comprising an electromagnetic holding brake, the holding brake comprising:
   a movable first plate;
   an electromagnet for holding the first plate in a predetermined position; and
   a fixed second plate arranged parallel to the movable first plate,
   wherein the first plate is clamped against both the electromagnet and the second plate when a current feeding the electromagnet is switched on and wherein the first and second plates are made of steel.

* * * * *